United States Patent [19]

Kataoka et al.

[11] Patent Number: 5,608,485

[45] Date of Patent: Mar. 4, 1997

[54] PHOTOGRAPHIC FILM CASSETTE HAVING A SPOOL LOCKING DEVICE AND CAMERA FOR USE WITH THE SAME

[75] Inventors: Hideaki Kataoka; Tomoyuki Takahashi, both of Kanagawa, Japan

[73] Assignee: Fuji Photo Film Co., Ltd., Kanagawa, Japan

[21] Appl. No.: 601,584

[22] Filed: Feb. 14, 1996

Related U.S. Application Data

[62] Division of Ser. No. 307,412, Sep. 19, 1994, Pat. No. 5,526,084, which is a continuation of Ser. No. 943,867, Sep. 11, 1992, abandoned.

[30] Foreign Application Priority Data

Sep. 21, 1991 [JP] Japan .................................. 3-261123
Oct. 24, 1991 [JP] Japan .................................. 3-277987
Nov. 25, 1991 [JP] Japan .................................. 3-309453

[51] Int. Cl.[6] ............................ G03B 17/02; G03B 17/26
[52] U.S. Cl. ....................... 396/514; 242/348.3; 396/538
[58] Field of Search .................................. 354/275, 288; 242/348.3, 348.4, 338

[56] References Cited

U.S. PATENT DOCUMENTS 5,115,268  5/1992  Kitagawa et al. .................. 354/275

*Primary Examiner*—Safet Metjahic
*Assistant Examiner*—J. K. Han
*Attorney, Agent, or Firm*—Sughrue, Mion, Zinn, Macpeak & Seas

[57] ABSTRACT

A photographic film cassette has photographic film wound on a spool and rotatably contained in a cassette shell. A leader of the photographic film is caused by rotation of the spool to advance outward from a passage mouth thereof. Two positioning holes are formed in an end face of the cassette shell on an advancing side as inserted into a cassette receiving chamber of a camera, and are fittable on projections of a camera when the cassette shell is loaded therein. Three projections are formed on the end face, and come into contact with an upper inside face of the chamber of the camera when the cassette is loaded in the camera, in order to position the cassette shell vertically. A locking device, which locks the film spool, is unlocked when the film cassette is loaded in the camera.

8 Claims, 16 Drawing Sheets

PHOTOGRAPHIC FILM CASSETTE HAVING A SPOOL LOCKING DEVICE AND CAMERA FOR USE WITH THE SAME

This is a divisional of application Ser. No. 08/307,412 filed Sep. 19, 1994, now U.S. Pat. No. 5,526,084 which is a Continuation Application of application Ser. No. 07/943,867 filed on Sep. 11, 1992, now abandoned.

BACKGROUND OF THE INVENTION

1. Field of the Invention

The present invention relates to a photographic film cassette and a camera for use therewith. More particularly, the invention relates to an improvement of a photographic film cassette in which a leader of a photographic film is caused, by rotation of a spool, to advance to the outside of a cassette shell, and a camera suitable therefor.

2. Description of the Related Art

A conventional photographic film cassette contains a 135-type photographic filmstrip (hereinafter referred to as "film"), having a leader which protrudes from a cassette shell prior to loading a camera therewith. When the camera is loaded with the cassette, the cassette shell is inserted into a cassette receiving chamber at the same time as the leader is widthwise inserted in position within the camera. In order to precisely position the cassette shell within the cassette receiving chamber, various positioning methods are known. For example, Japanese Utility Model Laid-Open Publication No. 49-75340 discloses a device having a positioning portion formed on a cassette shell which is kept in contact with a positioning member disposed in a cassette chamber.

As suggested in U.S. Pat. Nos. 4,834,306 and 4,938,429 and Japanese Patent Laid-Open Publication No. 3-37645 (corresponding to U.S. Ser. No. 07/870,212 and to EP 0 406 815 A2), a known photographic film cassette includes a photographic film positioned so that a leader does not protrude from the cassette shell prior to loading the cassette in a camera. Such a cassette is easily loaded into a camera. A simple film-advancing mechanism of the camera is typically used with this type of cassette and includes a construction which rotates a spool to unwind the photographic film, thereby causing the leader to move through a passageway for the photographic film and exit from the cassette.

There is, however, the possibility of accidental reuse of a cassette of this type because the cassette with the leader fully contained therein in an unused state is indiscernible from one in a used state. It has been suggested, e.g., in U.S. Pat. No. 5,023,642, to utilize a use-condition indicator/lock-out mechanism incorporated in a cassette for indicating a status of the photographic film, either exposed or unexposed, and for preventing the cassette from being reloaded in a camera after the photographic film is fully exposed. The cassette is also provided with a circularly disposed bar code, such as a DX code, for representing sensitivity, a maximum number of photographic frames, and latitude to be transmitted to a camera.

In a leader-advancing cassette, however, the leader may become jammed during initial advancement of the photographic film. This is because the leader might encounter upon a wall or a stepped portion caused by a deviation between a receiving mouth of the camera and the passage mouth as it is advanced out of the cassette shell. Further rotation of the spool in the unwinding direction might cause an increase in jamming at the outside of the passage mouth. This problem is not associated with a conventional leader-protruded cassette in which the leader can be manually inserted in a passage inside the camera without fail.

Such a leader-advancing cassette is also disadvantageous in that it may drop out of the cassette receiving chamber when removing the cassette therefrom after exposure because the cassette may be loaded through a bottom portion of the camera.

A conventional leader-advancing cassette, as described above, has a lock-out mechanism which requires a cooperating structure on the camera for locking out the cassette. The cassette having the use-condition indicator/lock-out mechanism and the circularly disposed bar code, is particularly disadvantageous in that it is so big that a very large camera must be designed therefor. This is inconsistent with the purpose of a leader-advancing cassette, which is convenience.

SUMMARY OF THE INVENTION

In view of the foregoing problems, an object of the present invention is to provide a leader-advancing photographic film cassette, and a camera for use therewith, wherein a leader of the photographic film is prevented from jamming during an initial advancement in a camera.

Another object of the present invention is to provide a leader-advancing photographic film cassette, and a camera for use therewith, wherein the cassette is prevented from dropping inadvertently out of the camera.

A further object of the present invention is to provide a leader-advancing photographic film cassette and a camera for use therewith wherein the size of the camera is minimized.

In order to achieve the above and other objects and advantages of this invention, at least two positioning holes are formed in one end face of a cassette shell where an end of a spool is exposed externally. The positioning holes are fittable on positioning projections of a camera when the cassette shell is loaded in the camera to thereby define a direction in which a passage mouth is directed within the camera. A contact device associated with the shell end face is placed in contact with a receiving device of the camera in order to position the cassette shell relative to an axial direction of the spool.

A cassette receiving chamber of the camera receives the cassette. A driving shaft is disposed in the chamber so as to be engaged with a spool end protruding from the cassette shell. At least two positioning projections are projected from an upper inside face of the cassette receiving chamber so as to fit into at least two positioning holes formed in the shell end face, in order to define a direction in which the passage mouth is directed within the camera. A receiving device is associated with the upper inside face of the cassette receiving chamber so as to come into contact with a contact device of the cassette in order to position the cassette relative to an axial direction of the spool.

Because a passage mouth of the cassette is reliably positioned in a cassette receiving chamber of the camera, a receiving mouth of the camera is never deviated with respect to a passage mouth of the cassette. Accordingly, the leader of the film will never jam during initial advancement.

In a preferred embodiment, a locking device is disposed in the cassette shell for locking the spool from rotating. The locking device is displaced to an unlocked position in response to loading the camera with the cassette.

An unlocking pin is inserted into a through hole formed in the cassette shell when the cassette is loaded in the receiving chamber. The through hole allows access to the locking device so as to allow the unlocking pin to move the locking device to an unlocked position when the unlocking pin is inserted into the through hole.

Further, the cassette shell is provided with an engaging portion which engages with an engaging member of the camera for preventing the cassette shell from falling out of the camera during removal of the cassette shell from the camera, even when a bottom opening through which the cassette shell has been inserted is directed downward.

Because a cassette shell of the cassette is engaged with the inside of a cassette receiving chamber of the camera, the cassette is prevented from sliding out of the cassette receiving chamber, whereby the convenience of the leader-advancing cassette can be further taken advantage of.

Furthermore, a data signaling device is associated with the cassette shell for representing data relating to a characteristic of the photographic film to be conveyed to the camera. A use-condition signaling device is associated with the cassette shell adjacent to the data signaling device for representing a condition of use of the photographic film. A representation of the use-condition signaling device is detected by the camera.

The cassette receiving chamber of the camera is provided with a sensor for detecting the outputs of the data signaling device and use-condition signaling device, respectively.

Because the use-condition signaling device and the data signaling device are mounted on the novel cassette in a compact disposition, the novel camera can be compact.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT OF THE PRESENT INVENTION

Figure 1:
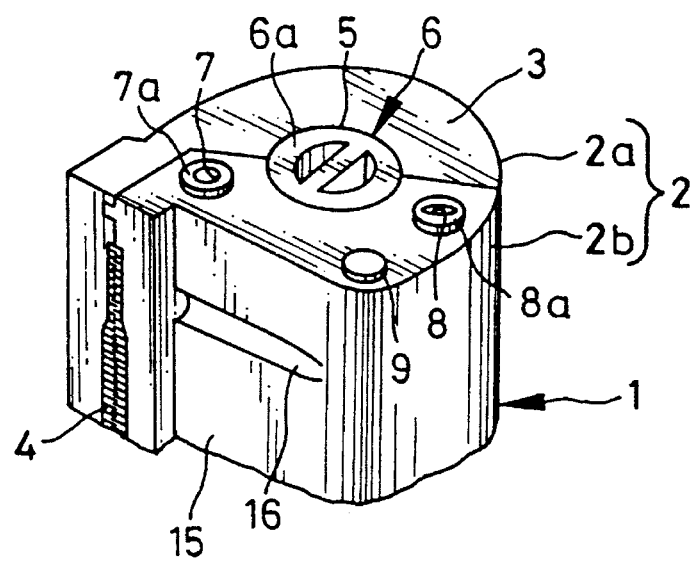
FIG. 1 is a partial perspective view illustrating a photographic film cassette of the preferred embodiment.
Figure 2:
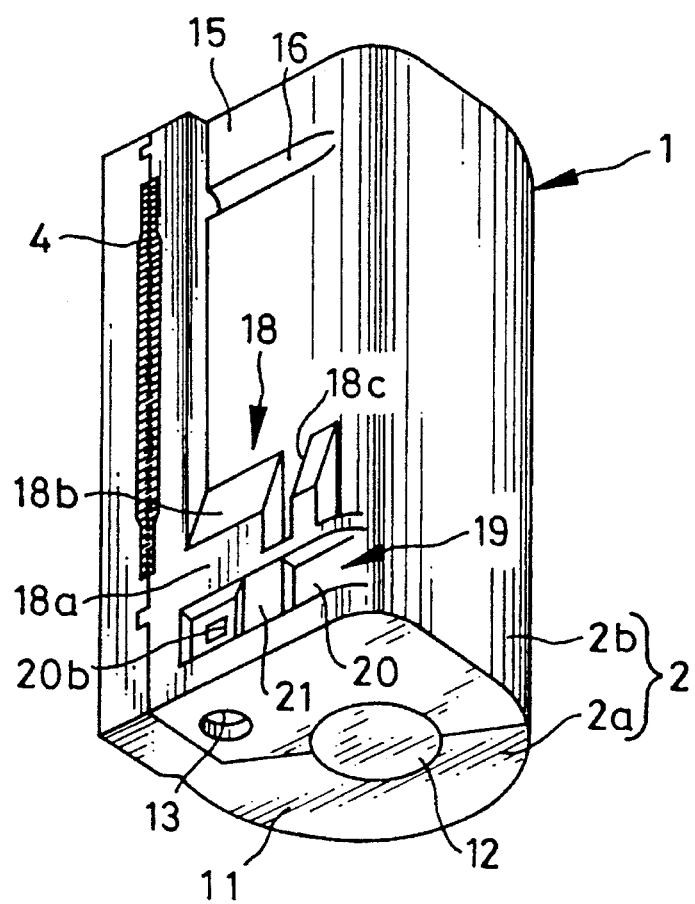
FIG. 2 is a perspective view illustrating the cassette as viewed from the bottom.
Figure 3:
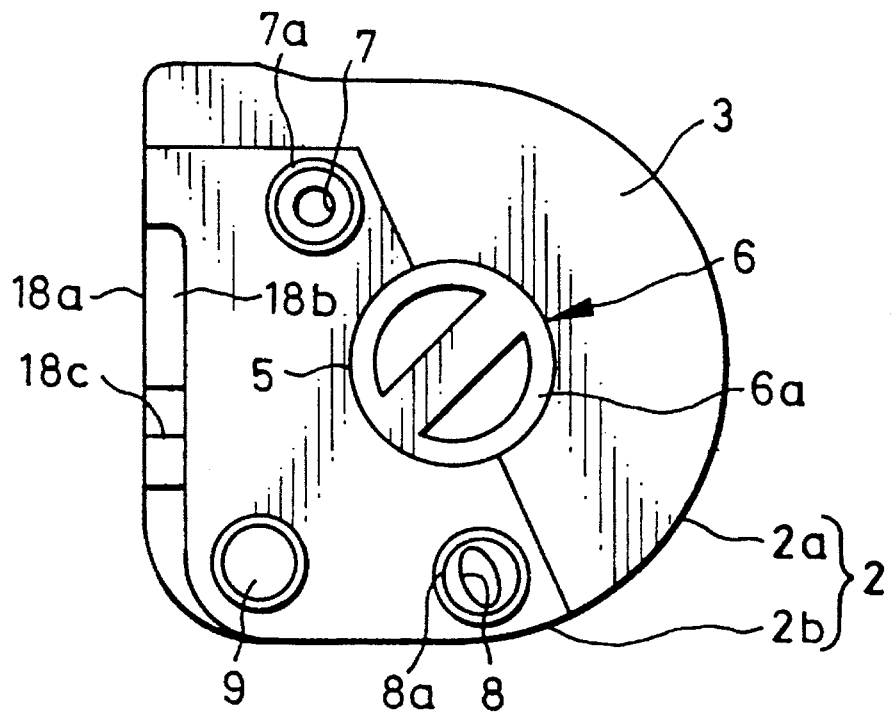
FIG. 3 is a top view illustrating the cassette.
Figure 16:
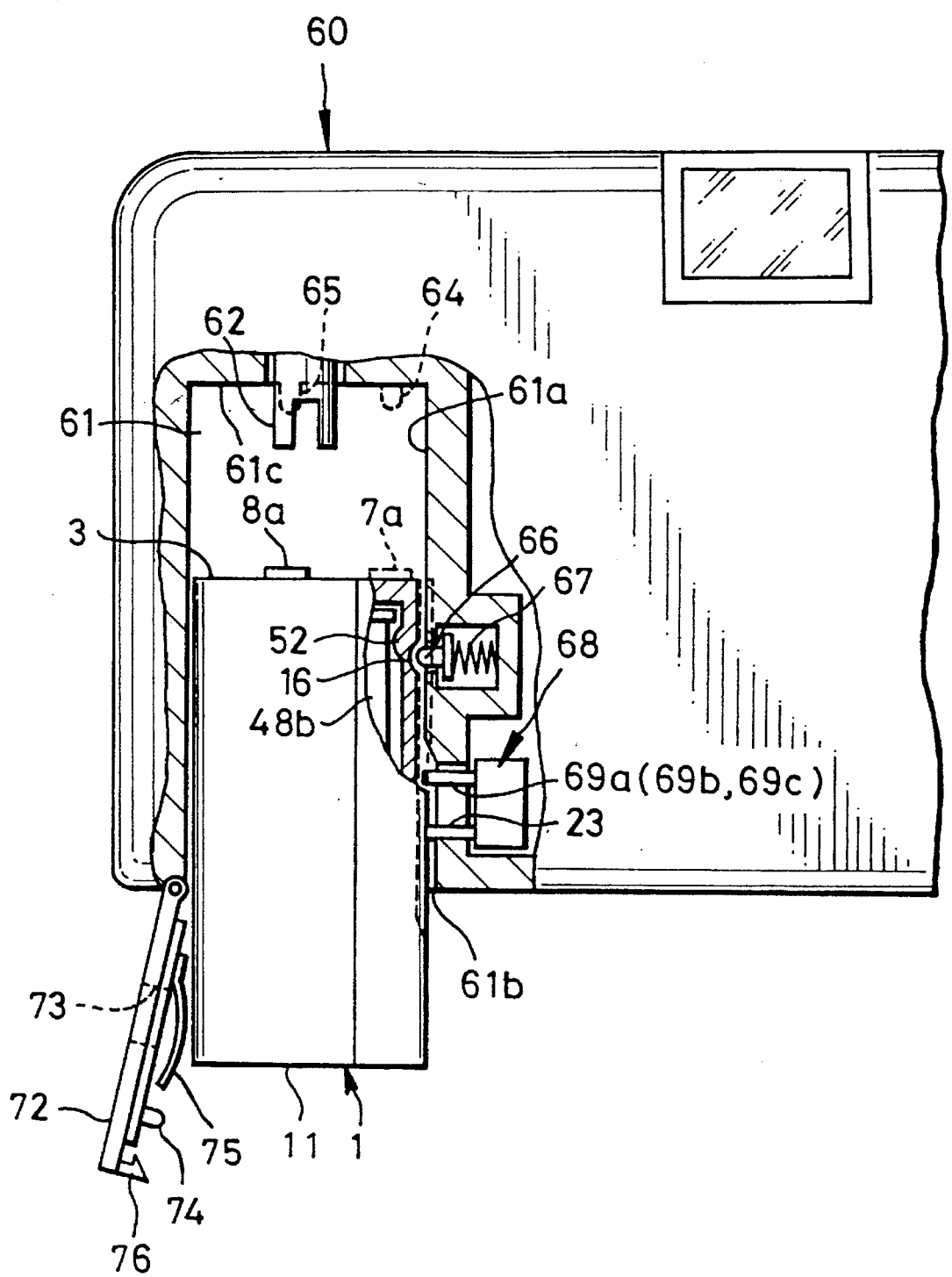
FIG. 16 is a rear elevation, in partial section, illustrating a cassette receiving chamber of a camera and the cassette as inserted therein.
Figure 17:
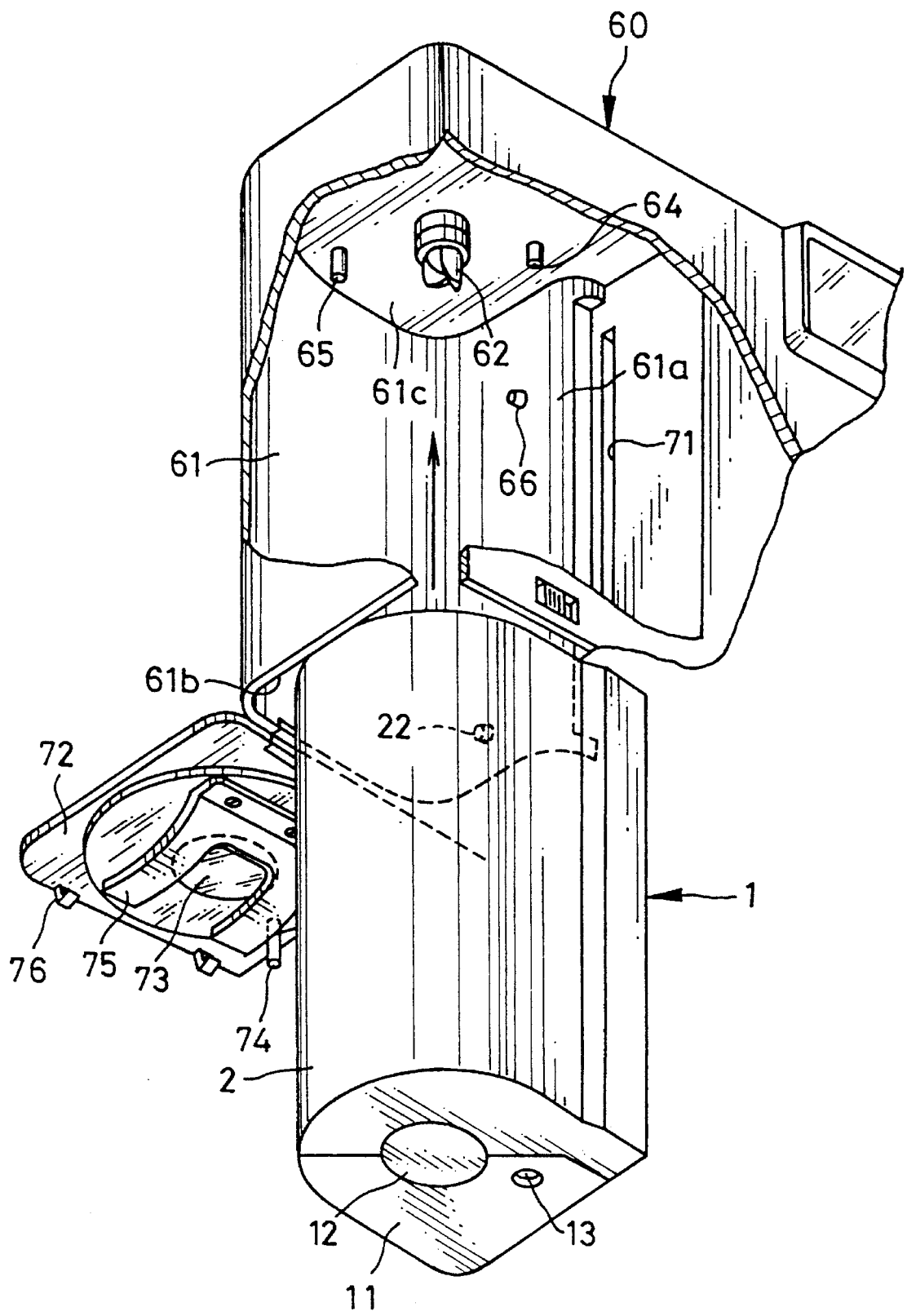
FIG. 17 is an explanatory view illustrating the cassette receiving chamber with the cassette.

FIGS. 1 to 7 illustrate a photographic film cassette 1 of the first embodiment which is adapted to be loaded in a cassette receiving chamber 61 of a camera 60 of the first embodiment (see FIGS. 16 and 17). A cassette shell 2 is constituted of a pair of shell halves 2a and 2b made of resin having a light-shielding characteristic. A cross section of the cassette shell is formed in a D-shape, as illustrated in FIG. 3, and a passage mouth 4, for photographic film, is formed in a portion of the cassette shell 2 which protrudes only slightly. An end face 3 of the cassette shell 2 has a bearing hole 5 formed therein and an end 6a of a spool 6 is exposed to the outside of the cassette shell 2 through the bearing hole 5.

Two positioning holes 7 and 8 are formed in the lower shell half 2b on the side of the end face 3. The holes 7 and 8 are formed during a molding operation of the lower shell half 2b. Accordingly, there is no deviation between cassettes as to the shapes and the relative positions of the holes 7 and 8. The hole 7 is circular, and is adapted to receiving a positioning pin 64 which projects from an upper inside face 61c of the cassette receiving chamber 61 when inserted therein. The hole 8 is of an elliptical shape with a major axis thereof extending in a direction toward the circular hole 7. The hole 8 is adapted to receiving a positioning pin 65 which also projects from the upper inside face 61c. The hole 8 may otherwise be a linearly elongated circular hole having a width at least as large as the diameter of the pin 65. Annular projections 7a and 8a project from the end face 3 around the holes 7 and 8, respectively. A contact projection 9 projects to the same height as the projections 7a and 8a. The projections 7a, 8a and 9 are in contact with the upper inside face 61c, which constitutes a receiving means, when cassette 1 is loaded in receiving chamber 61 so as to properly position the cassette shell 2 in the axial direction.

Figure 4:
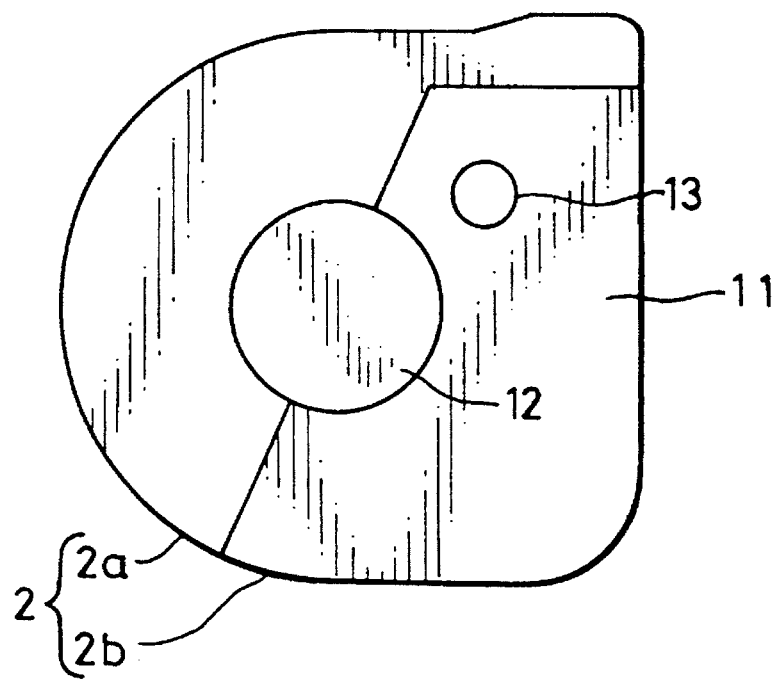
FIG. 4 is a bottom view illustrating the cassette.

An end face 11 of the cassette shell 2, which is opposite to the end face 3, is closed, and is provided, as illustrated in FIGS. 2 and 4, with a label 12 carrying a visible indication such as letters and numerals, from which the existence and the type of the cassette 1 can be recognized as seen through a transparent window 73 formed in a bottom door 72 of the cassette receiving chamber 61. The end face 11 also has a hole 13 formed therein for receiving an unlocking pin 74, which is disposed on the bottom door 72, when the bottom door 72 is closed. This is described in detail below.

A dropping-preventing groove 16 is formed in a circumferential surface 15 of the cassette shell 2 so as to engage with a pin 66 of the camera 60 for preventing the cassette shell 2 from dropping inadvertently out of the cassette receiving chamber 61.

Figure 5:
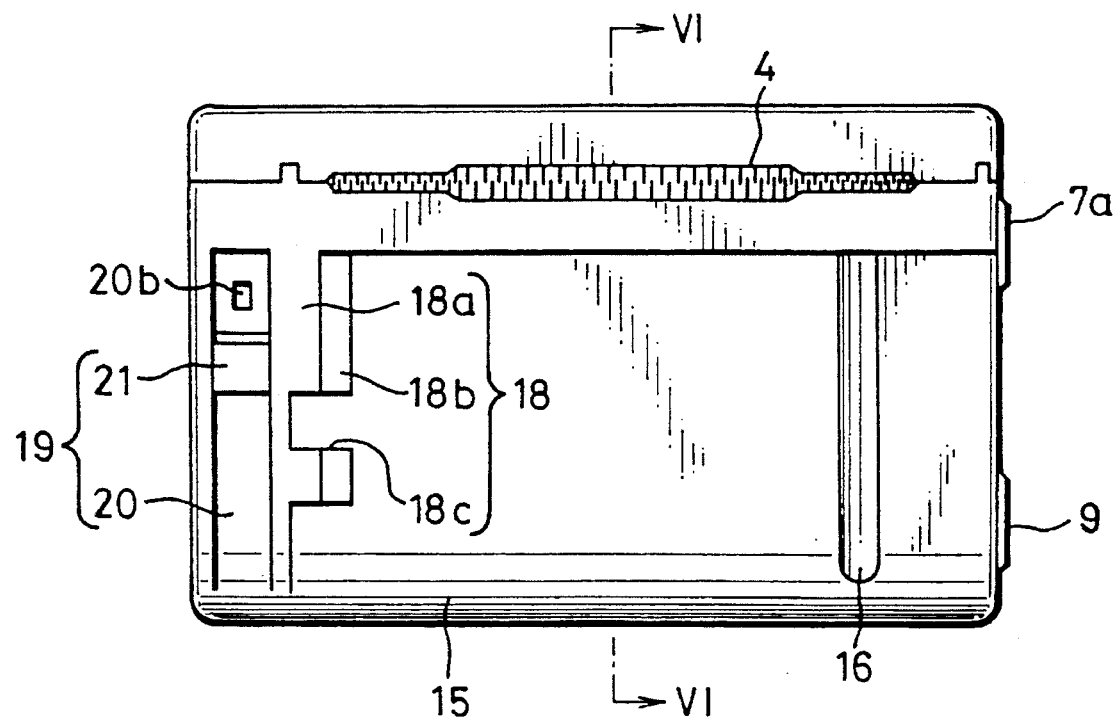
FIG. 5 is a side view illustrating the cassette, as viewed from the side of a passage mouth.

As illustrated particularly in FIGS. 2 and 5, a D X code pattern 18 and a use-condition signaling structure 19 are formed on the circumferential surface 15 at positions close to the end face 11. The DX code pattern 18 is adapted to transmitting sensitivity of photographic film to the camera 60, and includes tops 18a flush with a surface next to the passage mouth 4, guide slopes 18b for guiding code sensor pins 69a to 69c (see FIG. 16) of the camera to the tops 18a, and a recess 18c formed between the tops 18a.

Figure 6:
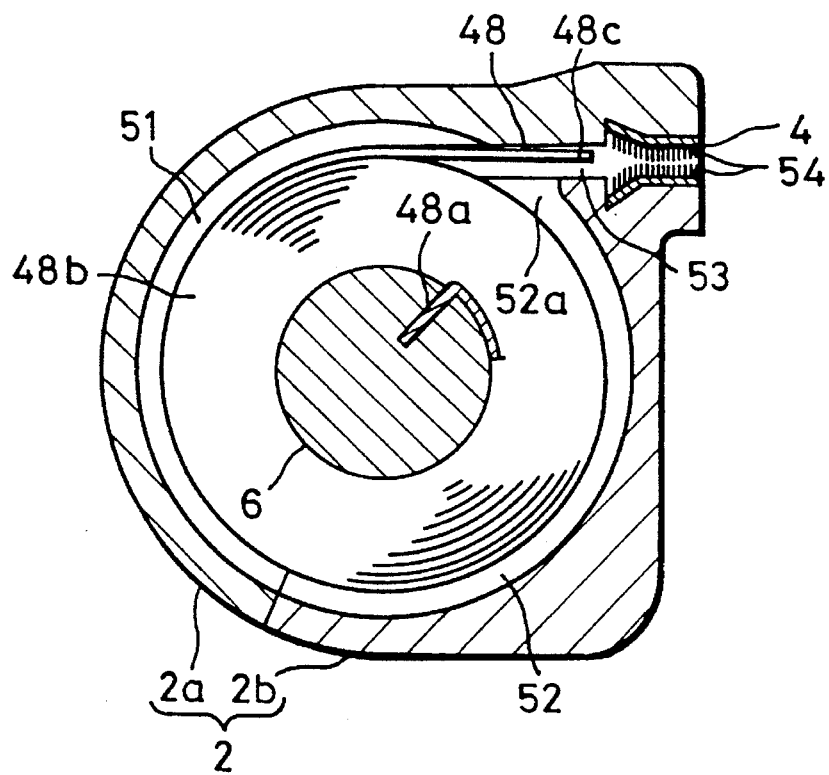
FIG. 6 is a cross section illustrating the cassette, taken on line VI—VI in FIG. 5.

FIG. 6 illustrates a roll 48b of photographic film 48 contained in the cassette shell 2. The photographic film 48 has a trailer 48a anchored on the spool 6, and is wound around the spool 6 in the form of the roll 48b within a roll chamber 46. Arcuate ridges 51 and 52 are formed on the inside of the shell halves 2a and 2b for preventing the roll 48b from loosening. One of the ridges 52 is provided with a separator claw 52a for separating a leader 48c of the photographic film 48 from the roll 48b, as the roll is turned clockwise, to direct it to a passageway 53 communicating to the passage mouth 4. Light-trapping fabric or plush 54 is disposed on inside surfaces of the passageway 53 for preventing light from entering the roll chamber 46.

Figure 7:
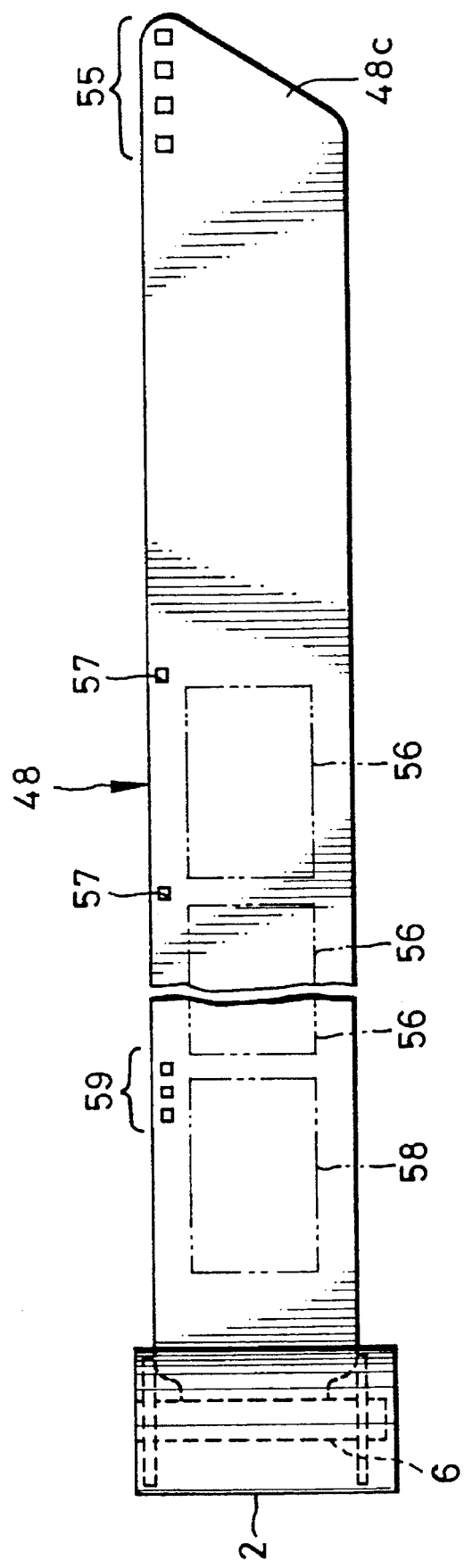
FIG. 7 is a rear view illustrating the cassette, with a photographic film fully unwound.

The leader 48c, as illustrated in FIG. 7, is shaped slantwise so as to project on a side corresponding to the separator claw 52a. Several take-up perforations 55 are formed in the leader 48c along edges thereof to be engaged with claws of a take-up spool of the camera 60. Holes 57, to be detected for positioning the photographic film 48 in the camera 60, are formed in the photographic film 48 at a pitch equal to that of picture frames 56 in which images are recorded on the photographic film 48. Proximate a final picture frame 58, three holes 59 are formed for detecting the last frame 58 of the photographic film 48. The holes 57 and 59 are arranged along the film edge on the side thereof that corresponds to the end of the spool which is driven by the camera 60. A photo sensor (not illustrated) for detection of holes 57 and 59 is disposed in the camera 60.

Figure 8:
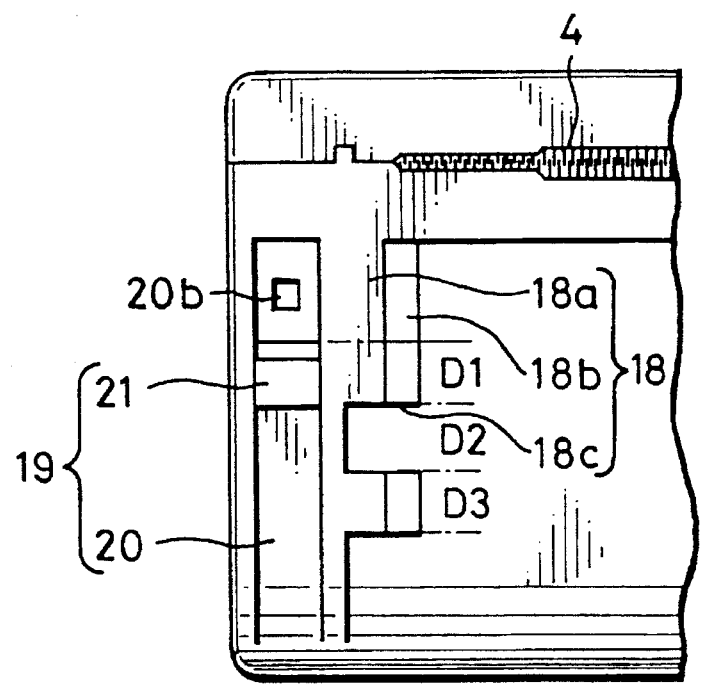
FIG. 8 is an explanatory view illustrating a protruded/retracted pattern of a DX code representing ISO 800.
Figure 9:
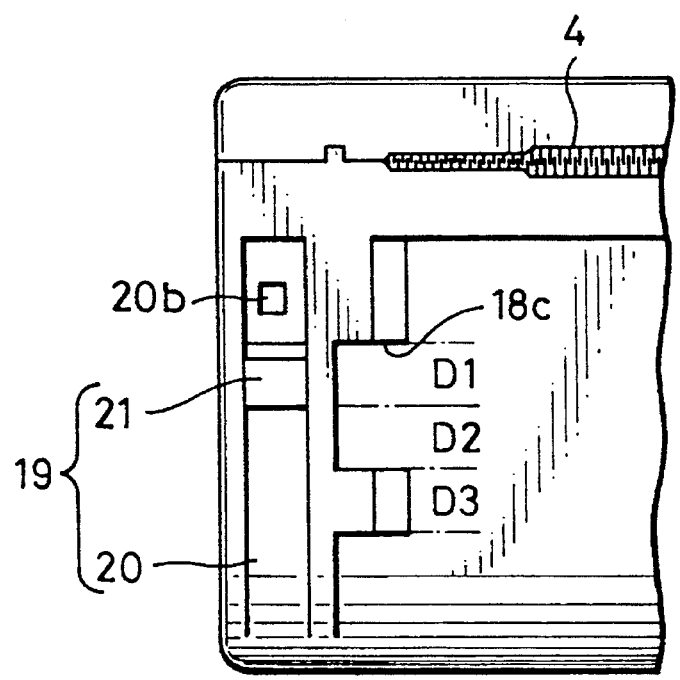
FIG. 9 is an explanatory view illustrating another DX code pattern, representing ISO 50.

The recess 18c is modifiable in position and width according to sensitivity so as to be indicative of the sensitivity (see FIGS. 8 and 9). Three positions D1, D2 and D3 correspond to binary digits, where a recess 18c designates a "0" and the lack thereof designates a "1." A code of the three digits of such a binary value represents the sensitivity. The relationship between the code and the sensitivity is illustrated in a table below. For example, the DX code in FIG. 8 designates ISO 800, and a DX code in FIG. 9 designates ISO 50.

| Code | | | ISO |
| --- | --- | --- | --- |
| D1 | D2 | D3 | Sensitivity |
| 0 | 0 | 0 | Unused |
| 0 | 0 | 1 | 50 |
| 0 | 1 | 0 | 100 |
| 0 | 1 | 1 | 200 |
| 1 | 0 | 0 | 400 |
| 1 | 0 | 1 | 800 |
| 1 | 1 | 0 | 1600 |
| 1 | 1 | 1 | Unused |

The codes "000" and "111" are avoided because they may be confused with uncoded cassettes having no pattern.

Figure 10:
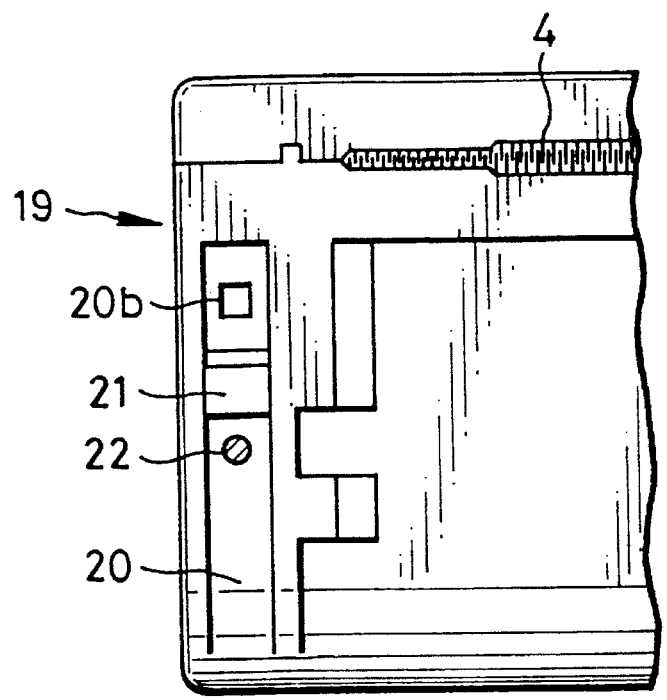
FIG. 10 is an explanatory view illustrating a representation of an unused state of the cassette.

The use-condition signaling structure 19 is constituted of a groove 20 and a signaling slider 21 slidably fitted therein so as to represent a condition of exposure of the photographic film 48 by its position within the groove 20. The slider 21 is shifted from the unexposed position shown in FIG. 10 to the exposed position shown in FIG. 11 by a shifter 22 of the camera 60 (see FIG. 17) which is moved when the bottom door 72 is closed or at any other suitable time. Notches 20a and 20b are respectively formed in the groove 20 in the unused and used portions. A triangular claw 21a is formed behind the slider 21 (see FIG. 12).

Before the cassette 1 is used, the slider 21 is in the unexposed position where the claw 21a is engaged with the notch 20a. When the film 48 in the cassette 1 has been entirely exposed, the slider 21 has been shifted to the exposed position by shifter 22 so that the notch 20b arrests the claw 21a. Claw 21 keeps the slider 21 from returning to the unexposed position. The advancing edge of the slider 21 is so inclined that it can move while in contact with a slider sensor pin 23 (see FIGS. 13 and 16), which is constantly projected from the camera 60 into the groove 20 for detecting the position of the slider 21 so as to determine the unexposed or exposed state. The tip of the slider sensor pin 23 is spherical so as to allow the slider 21 to slide between the slider sensor pin 23 and the bottom of the groove 20. It is note that, while inserting the cassette 1 into the chamber, the extended guide slope 18b from the digit D1 toward the passage mouth 4 is adapted to guide the slider sensor pin 23 of the camera 60 to the use-condition signaling structure 19.

Figure 13:
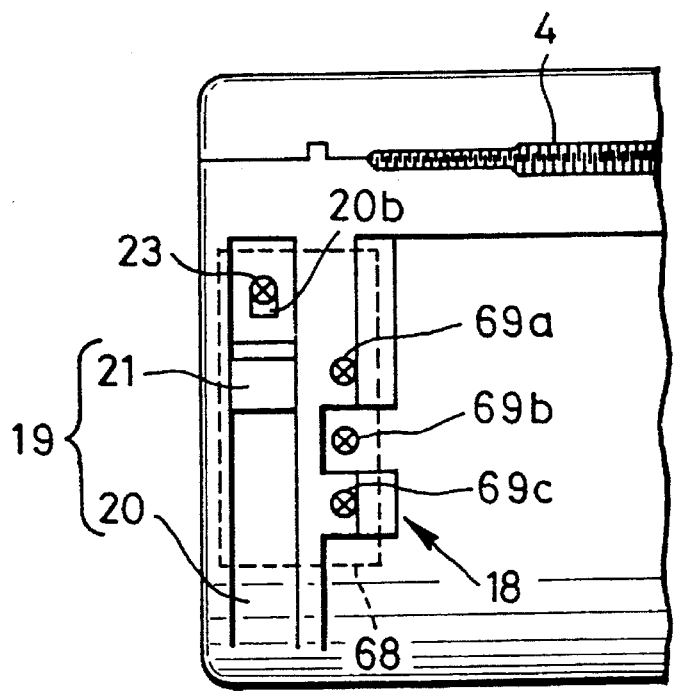
FIG. 13 is an explanatory view illustrating relationship in arrangement between sensor pins of the camera of the preferred embodiment and a DX code pattern and a use-condition signaling structure.

The disposition of the sensor pins 23 and 69a to 69c are illustrated in FIG. 13 with respect to the DX code pattern 18 and the use-condition signaling structure 19. The slider sensor pin 23 corresponds in position to the notch 20b or the used position of the signaling slider 21. The code sensor pins 69a to 69c correspond to the digits D1 to D3 of the DX code pattern 18.

Figure 12:
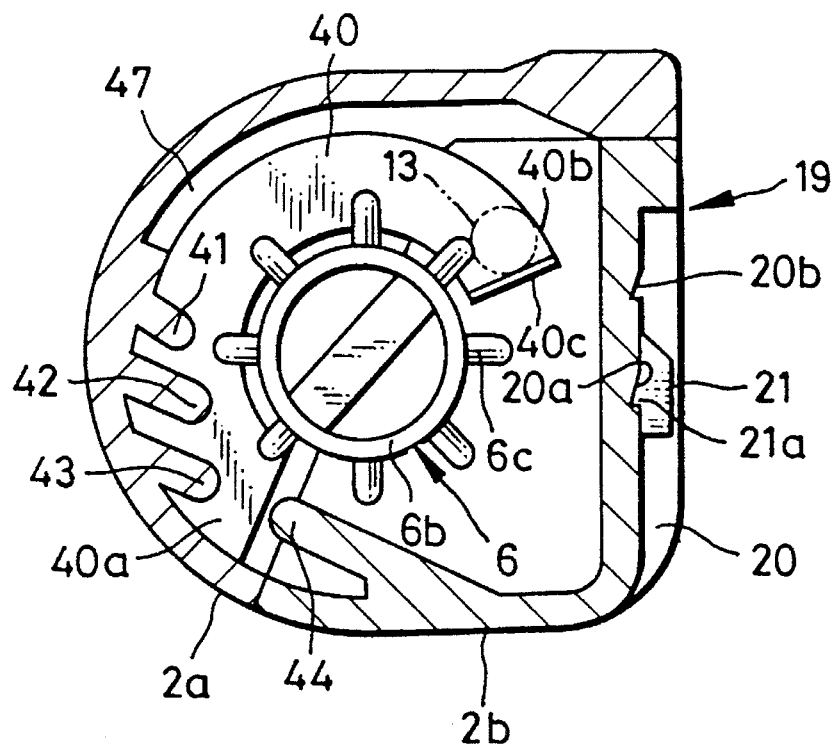
FIG. 12 is a cross section illustrating the cassette, taken on line XII—XII in FIG. 5, particularly illustrating a mechanism for locking the spool.
Figure 14:
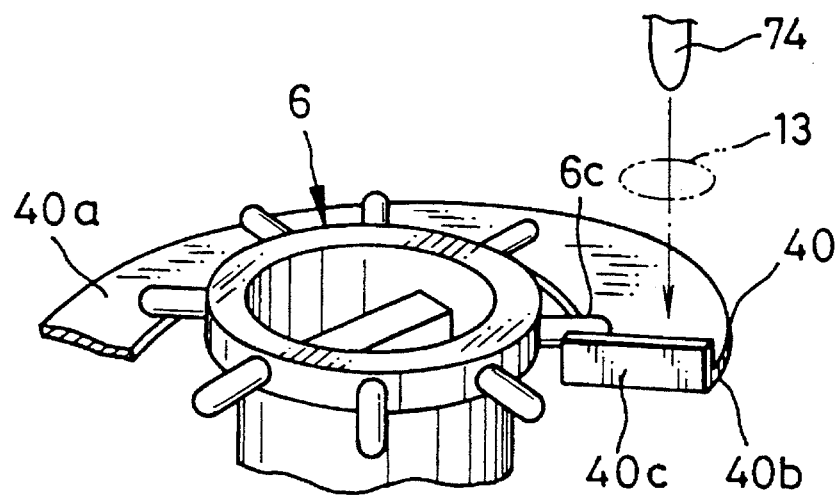
FIG. 14 is a perspective view illustrating important portions of the spool locking mechanism as viewed from the bottom.

Inside the end face 11 is disposed a spring plate constituting a spool locking mechanism, having an arcuate shape for locking the spool 6, as illustrated in FIGS. 12 and 14. A proximal end 40a of the spring 40 is fixed on the upper shell half 2a, whereas an extended portion 40b thereof is free. The extended portion 40b is gently slanted toward an inside of the hole 13, and has a stopper 40c extending downward from its distal end (see FIG. 14). The slant of the spring 40 presses a toothed wheel 6b of the spool 6 toward the end face 11, and causes the stopper 40c to engage with a tooth 6c of the toothed wheel 6b so as to stop the spool 6 from rotating.

Figure 15:
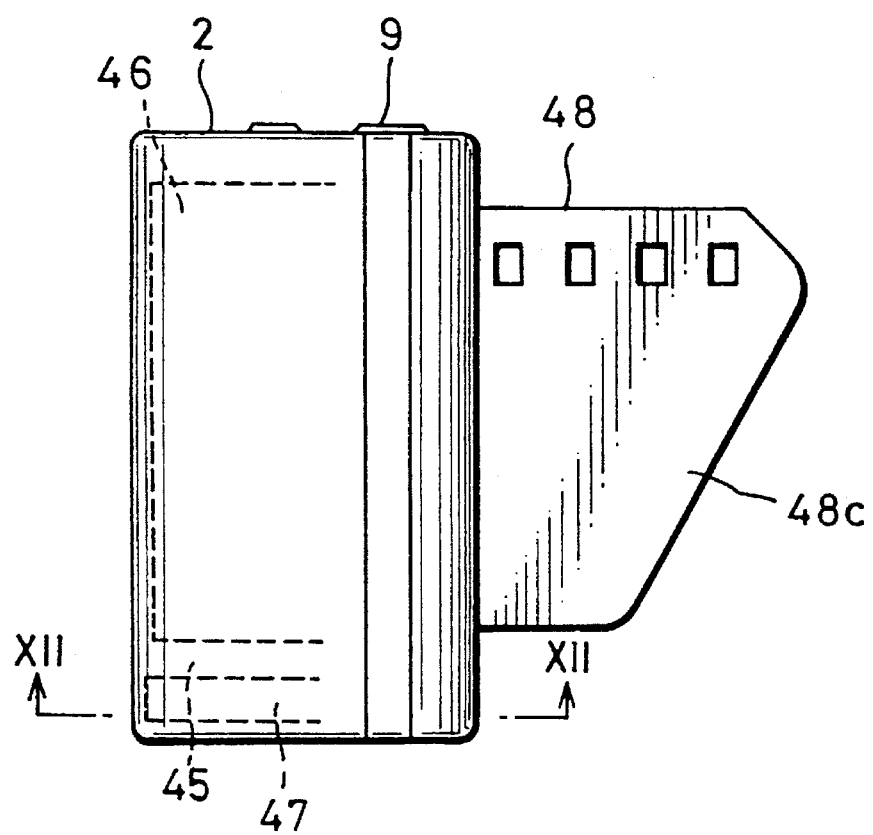
FIG. 15 is a rear view illustrating the cassette, with a leader exited therefrom.

Projections 41, 42 and 43 are formed on the inside of shell half 2a, as illustrated in FIG. 12. The spring proximal end 40a is fitted on the upper shell half 2a between the projections 41 to 43 and a partition 45 (see FIG. 15). A projection 44 is formed inside the lower shell half 2b in a spool locking chamber 47 to abut on the proximal end 40a to prevent the proximal end 40a from dropping off from the projections 41 to 43. As illustrated in FIG. 15, the spool locking chamber 47 is separated from a roll chamber 46 by the partition 45.

The camera 60 of the first embodiment for use with the cassette 1 will now be described referring to FIGS. 16 and 17. The cassette receiving chamber 61 for receiving the cassette 1 axially has a fork 62 on the upper inside face 61c thereof to be engaged with the spool end 6a for driving the spool 6. The positioning pins 64 and 65 are disposed beside the fork 62 for preventing the cassette shell 2 from rotational deviation within the cassette receiving chamber 61.

The dropping-preventing pin 66 is disposed so as to project from a circumferential inside surface 61a of the cassette receiving chamber 61. Spring 67 biases pin 66 into engagement with the groove 16 in order to prevent the cassette 1 from dropping out of the cassette receiving chamber 61 inadvertently. A sensor unit 68 is disposed in the surface 61a close to a bottom opening 61b of the cassette receiving chamber 61. The code sensor pins 69a to 69c are projected from the sensor unit 68 toward the cassette 1, as inserted, for detecting the DX code pattern 18. In a similar manner, the slider sensor pin 23 is projected from the sensor unit 68 toward the cassette 1.

A receiving mouth 71 is formed inside the receiving chamber 61 for allowing the photographic film 48 to pass therethrough. The receiving mouth 71 communicates to a film take-up chamber of the camera 60, and is adapted to directing the leader 48c, as advanced out of the passage mouth 4, toward the film take-up chamber via an exposure aperture. The unlocking pin 74 is disposed on the bottom door 72 and is adapted to passing through the hole 13, when the door 72 is closed, in order to press the extended portion 40b of the spring plate 40, so as to unlock the spool 6 from a locked state due to engagement between the tooth 6c and the stopper 40c. The cassette 1, as loaded in the cassette receiving chamber 61, is pressed by a leaf spring 75 on the bottom door 72. The door 72, as closed, is locked by a locking claw 76.

An operation of the above construction is now described. The slider 21 of the use-condition signaling structure 19 assumes the unexposed position of FIG. 8 before the cassette 1 is used. To avoid inadvertently exiting the leader 48c out of the passage mouth 4, the spool 6 is locked by engagement of the tooth 6c with the stopper 40c so as to avoid inadvertent rotation, during transportation and storage, and prevent the photographic film 48 from fogging (see FIGS. 12 and 14).

To load the camera 60 with the cassette 1, the bottom door 72 is open to expose the bottom opening 61b, through which the cassette 1 is inserted into the cassette receiving chamber 61 with the end face 3 inserted first, as illustrated in FIGS. 16 and 17. Full insertion of the cassette 1 engages the fork 62 with the spool end 6a and fits the positioning holes 7 and 8 on the positioning pins 64 and 65. While loading the cassette 1, the fork 62 is allowed to freely rotate so that the fork 62 will easily engage with the spool end 6a in full insertion of the cassette 1, with assistance from the tapered ends of the fork 62.

The positioning projection 9 and the annular projections 7a and 8a on the end face 3 of the cassette shell 2 abut upon the flat receiving surfaces or the upper inside face 61c of the chamber 61, by assistance of the upward push of the leaf spring. The end face 3, accordingly, is positioned with respect to the three points of triangular disposition of the projections 7a, 8a and 9 and kept from loosening with respect to the axial direction in the chamber 61. Because the three projections 7a, 8a and 9 are formed integrally with the lower shell half 2b, the precise positioning will never be influenced by any deviation in assembling the shell halves 2a and 2b.

The slider sensor pin 23 is guided by the extended guide slope 18b up into the groove 20, at the same time as the code sensor pins 69a and 69c are set in contact in the predetermined positions as illustrated in FIG. 13. The slider sensor pin 23 does not detect the slider when the slider is in the unused position. The DX code of the pattern 18 is detected by the code sensor pins 69a and 69c to read the sensitivity of the photographic film 48 and input the sensitivity into a controller of the camera 60.

The pins 64 and 65, fitted in the holes 7 and 8, prevent the cassette shell 2 from moving horizontally or rotationally in the chamber 61. The elliptical shape of the hole 8 is arranged to be directed to the circular hole 7 and is as wide as the pin 65 to be fitted therein, so that the pins 64 and 65 keep the cassette shell 2 from swinging in the chamber 61. The elliptical shape is advantageous in compensating for any small deviation between the interval between the pins 64 and 65 and the interval between the holes 7 and 8.

With the bottom door 72 closed, the cassette 1 is pressed by the leaf spring 75 upward as to hold the end face 3 on to the upper side face 61c. At the same time, the unlocking pin 74 on the door 72 is inserted through the hole 13 in the lower end face 11, and presses the extended portion 40b of the spring plate 40, which is flexed toward the partition 45 in FIG. 15 until it disengages the stopper 40c from the tooth 6c of the wheel 6b so as to allow the spool 6 to be rotatable. Because the spring plate 40 is arcuate as in FIG. 12, the spool 6 will never be influenced in rotation by the spring plate 40.

The bottom door 72 is locked after it is closed. The passage mouth 4 in the cassette shell 2 is positioned in the cassette receiving chamber 61 in exact opposition to the receiving mouth 71 in the camera 60 inside the chamber 61. Locking of the bottom door 72 is detected by the camera 60, which in turn actuates a film advancing mechanism incorporated therein to drive the fork 62 so as to rotate in the film unwinding direction.

When the spool 6 is rotated by the fork 62, the roll 48b of the photographic film 48 rotates together in the unwinding direction. This is because the roll 48b is in contact with the ridges 51 and 52 which prevent looseness of the roll 48b and thus cause rotation of the spool 6 to be transmitted to the roll 48b. During the rotation of the roll 48b, the end of the leader 48c abuts upon and is separated by the separator claw 52a to be directed to the passage mouth 4. The leader 48c exits from the passage mouth 4 and passes through the receiving mouth 71 and into a passage within the camera 60. The take-up spool of the camera 60 is rotated together with the fork 62, and engages with the take-up perforations 55 in the leader 48c by virtue of the take-up claws when the leader 48c reaches the film take-up chamber. Further rotation of the take-up spool draws the photographic film 48 out of the cassette shell 2.

When the first frame hole 57 is detected, the photographic film 48 is stopped and positioned on the exposure aperture to photographically expose the first picture frame 56 and create a latent image thereon. Each time a photograph is taken, the photographic film 48 is advanced, until detection of the following frame hole 57, and positioned on the exposure aperture. After the final picture frame 58 is created on the photographic film 48, the hole train 59 is detected by the camera 60, which responsively rotates the fork 62 in a reverse direction, so as to rotate the spool 6 in the winding-up direction.

Figure 11:
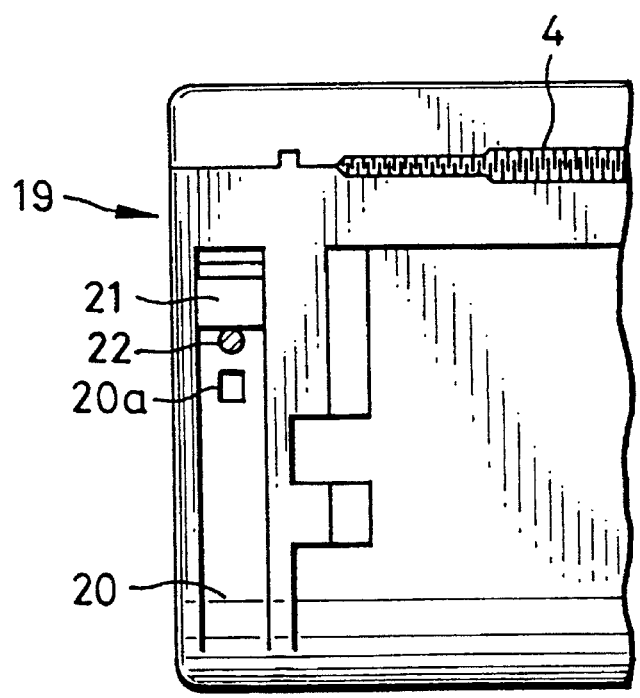
FIG. 11 is an explanatory view illustrating a representation of a used state of the cassette.

When all the photographic film 48 is wound back up into the cassette shell 2, the camera 60 stops the fork 62 in response to an end signal which is generated based upon the absence of film in the other portions of the camera. Opening of the bottom door 72 causes the camera 60 to actuate the shifter 22 to shift the slider 21 from the unexposed position to the exposed position, as illustrated in FIG. 11. When the bottom opening 61b is directed downward with the door 72 open, the spool end 6a and the holes 7 and 8 are disengaged from the fork 62 and the pins 64 and 65, respectively, due to gravity. The cassette shell 2, which otherwise would drop completely out of the chamber 61, is stopped from dropping by engagement of the groove 16 with the preventive pin 66. It is noted that the lower portion of the cassette shell 2 is allowed to project from the bottom opening 61b when the door 72 is opened while facing downward. Accordingly, the cassette shell 2 can be easily pulled from the bottom opening 61b by the photographer, and the cassette 1 as used can be easily removed from the camera 60.

Note that the slider 21 is maintained in the exposed position by engagement of the claw 21a with the notch 20b, and cannot be moved back to the unexposed position. The slider 21 positively indicates the exposed state of the photographic film 48 so that there is little possibility of inadvertently reusing the same cassette 1.

Should the used cassette 1 be loaded in the camera 60, the slider sensor pin 23 detects the slider 21 in the exposed position, in response to which the camera 60 sounds an alarm and stops executing a photographic sequence, such as advancement of the photographic film.

Figure 18:
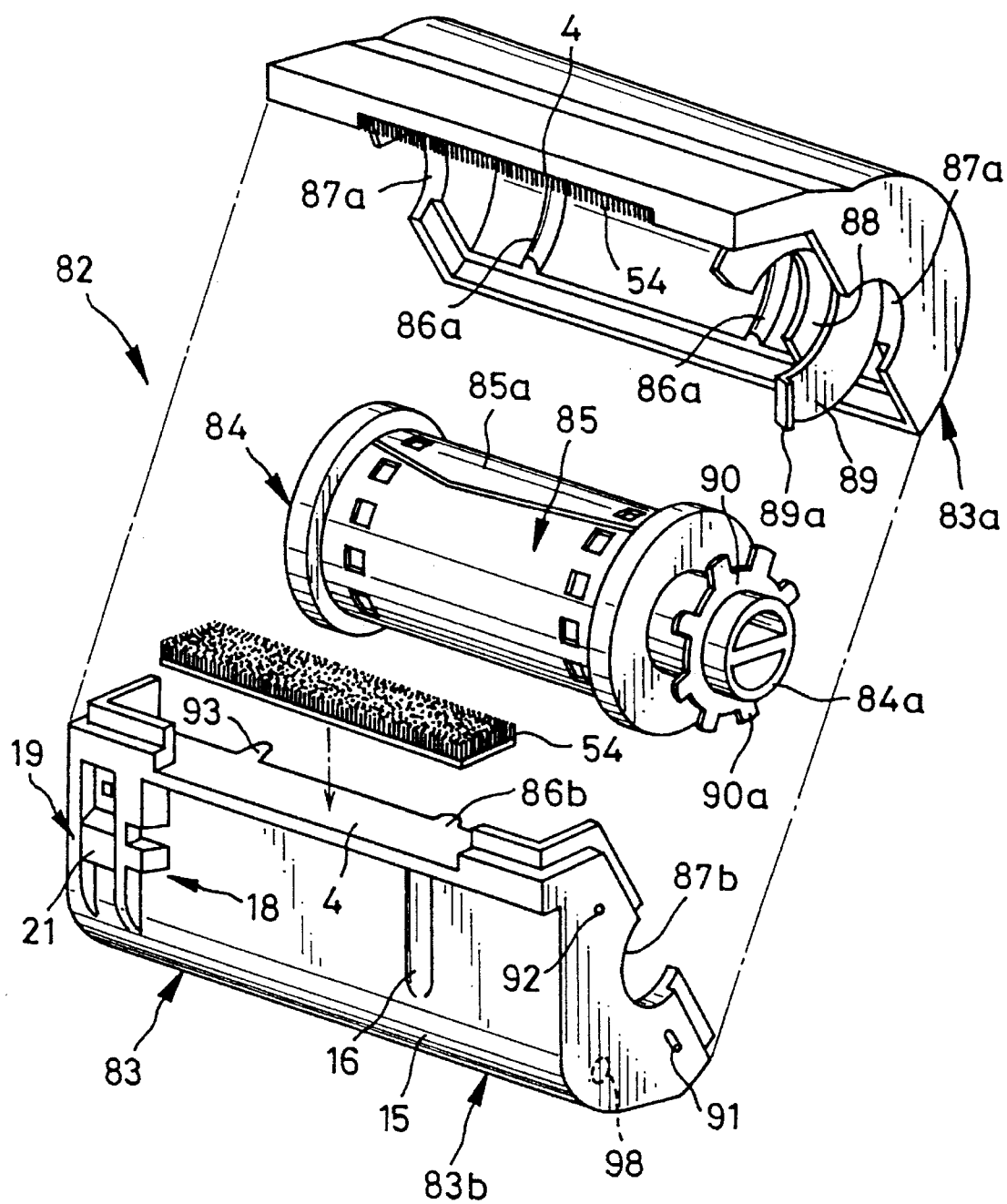
FIG. 18 is an exploded perspective view illustrating another cassette according to a second preferred embodiment of the present invention.
Figure 19:
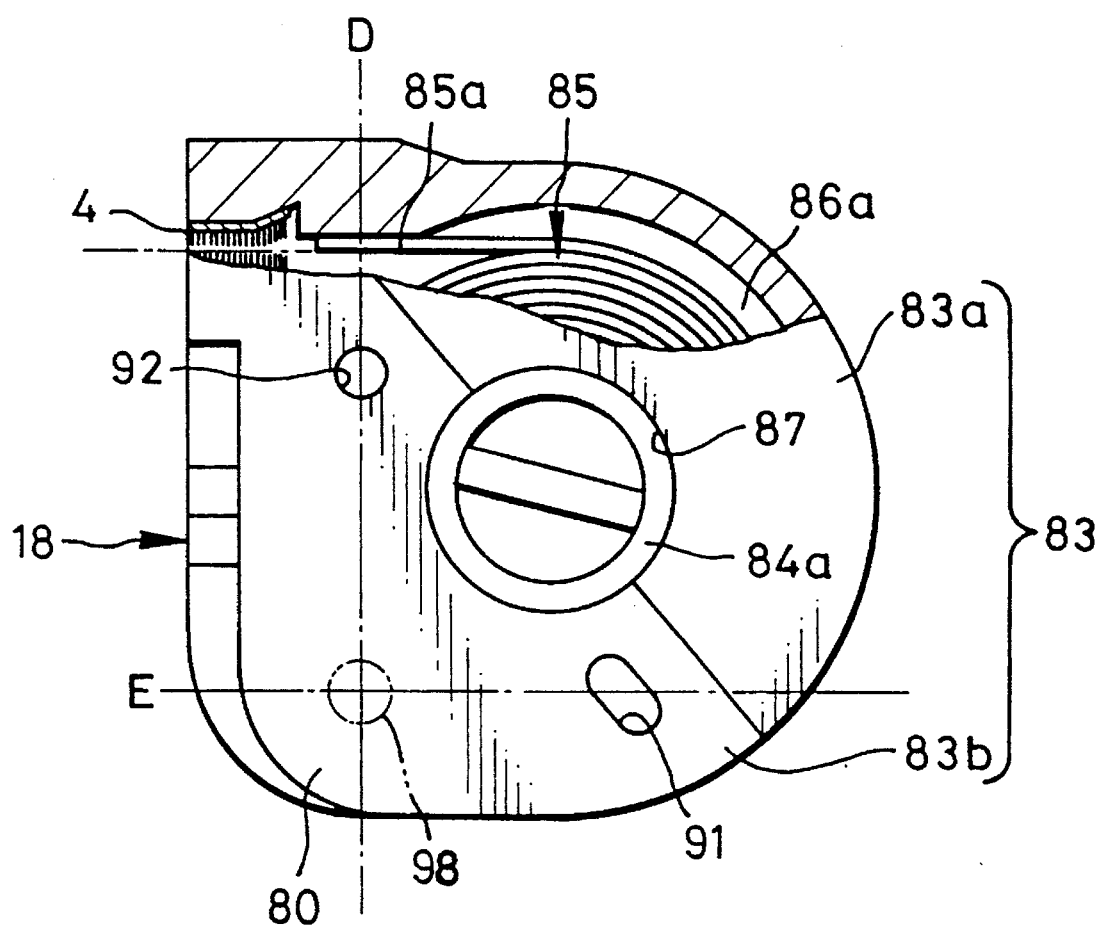
FIG. 19 is a top view, in partial section, illustrating the cassette of FIG. 18.
Figure 20:
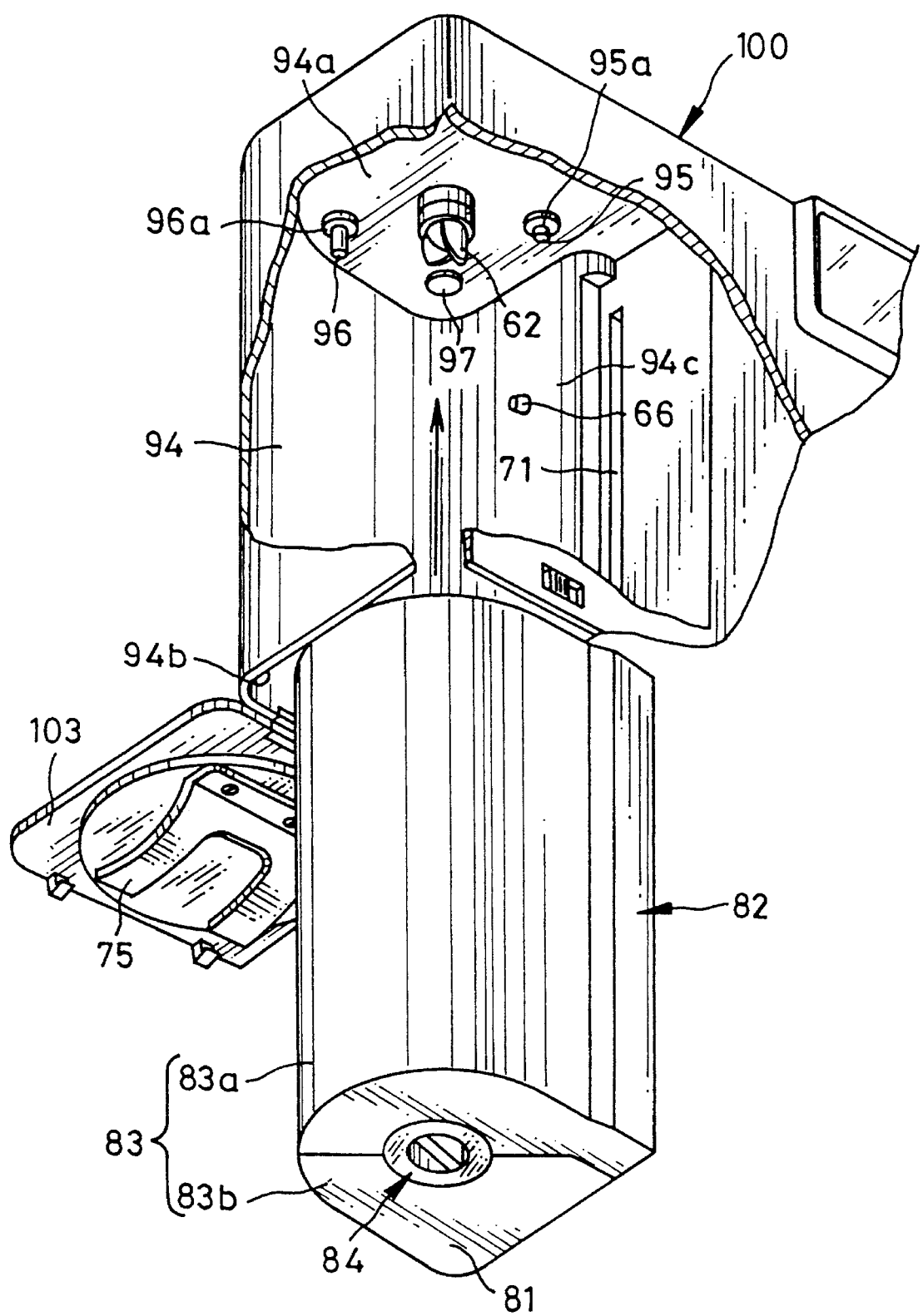
FIG. 20 is an explanatory view illustrating a cassette receiving chamber of a camera, adapted to the cassette of the second embodiment.
Figure 21:
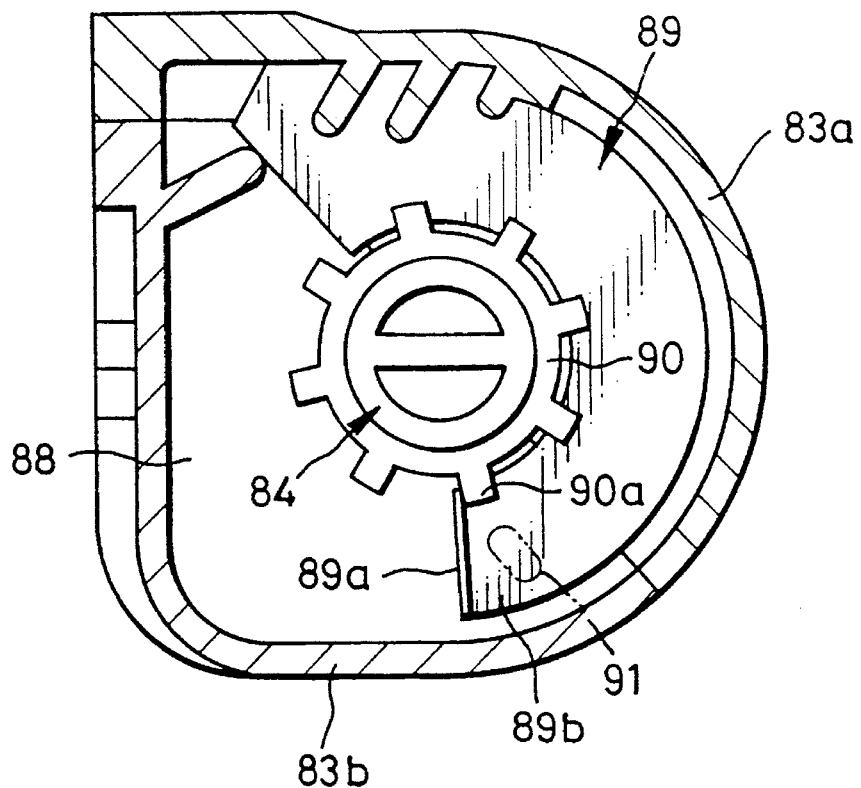
FIG. 21 is a cross section illustrating the cassette of the second embodiment.
Figure 22:
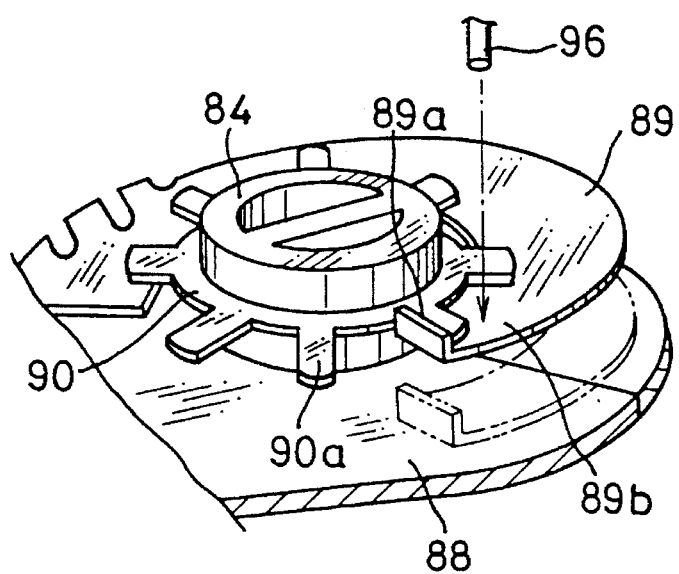
FIG. 22 is a perspective view illustrating important portions of the spool locking mechanism as viewed from the top.
Figure 23:
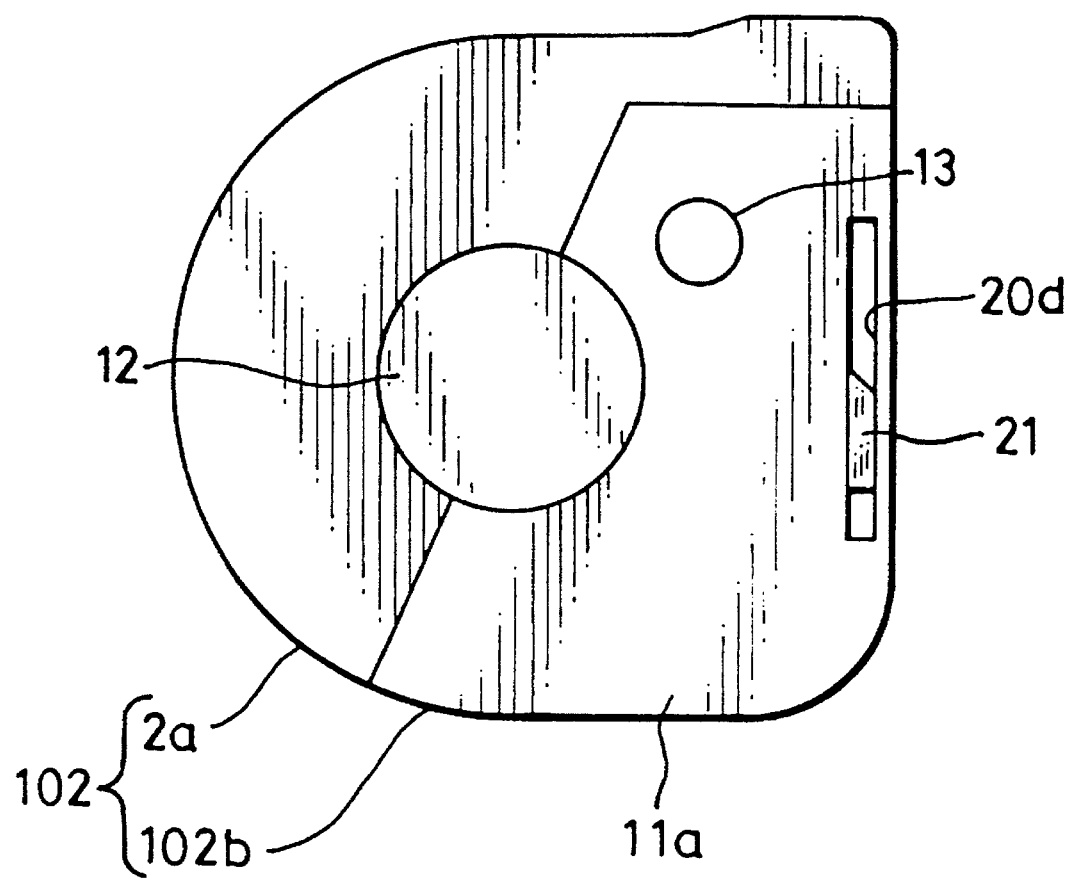
FIG. 23 is a bottom view illustrating a variation of the cassette in which a signaling slider is visible through a cassette end face.

FIGS. 18 to 22 illustrate another preferred embodiment in which a positioning pin 96 also serves as an unlocking pin (see FIG. 18). Elements similar to those of the former embodiment are represented with the same reference numerals. In FIG. 18, photographic film cassette 82 has a cassette shell 83, a spool 84 and a photographic film 85. A pair of shell halves 83a and 83b are provided with arcuate ridges 86a and 86b (only 86a is illustrated) for preventing looseness of the roll of the photographic film 85. A spool end 84a is exposed to the outside of a bearing hole 87 as illustrated in FIGS. 19 and 20. A reference numeral 93 designates a separator claw.

A partition 88 is formed on the upper shell half 83a to separate a spool locking chamber from a roll chamber. A spring plate 89 is held on the partition 88, and has an extended portion 89b and a stopper portion 89a projecting from its distal end (see FIG. 22). The stopper 89a is adapted to engagement with a tooth 90a of a toothed wheel 90 on the spool 84 so as to stop the spool 84 from rotating.

The positioning pin 96 of the camera 100, as illustrated in FIG. 20, is longer than another positioning pin 95, and is adapted to passing through a positioning hole 91, which is a through hole in an end face 80 of cassette shell 83. Hole 92 receives the pin 95. The hole 91 is situated in correspondence with the extended portion 89b. The pin 96, when inserted through the hole 91, presses the extended portion 89b so as to disengage stopper portion 89a from a tooth 90a. The positioning hole 91 is elliptical or elongated, whereas the hole 92 is circular.

A projection 97 is formed to project from an upper inside face 94a of a cassette receiving chamber 94, at a height smaller than the pin 95, at a location in front of the pin 95 and to the right of the pin 96, as viewed with reference to the camera 100. Circular receiving projections 95a and 96a are formed around the pins 95 and 96. The projections 95a and 96a have a height the same as that of the projection 97. A reference numeral 94b designates a bottom opening, 94c a circumferential inside surface of the cassette receiving chamber 94, and 103 a bottom door.

When the cassette 82 is still unused, the photographic film 85 is wholly contained in the cassette shell 83 up to a leader 85a, as illustrated in FIG. 19. The locking spring plate 89 is in a locking position indicated by the solid line in FIG. 22. Upon insertion of the cassette 82, the receiving projections 95a, 96a and 97 are in contact with an upper end face 80 of the cassette shell 83, so as to position the cassette shell 83 in the cassette receiving chamber 94 with respect to the axial direction of the spool 84. The receiving projection 97 is placed in a position 98 (see FIG. 18) where a line passing through the hole 92 and a line passing through the hole 91 intersect at right angles. In other words, position 98 and holes 91 and 92 subsequently define a right triangle. The pin 96 both positions the cassette shell 83 and unlocks the spool 84, as indicated with the two-dot-dash lines in FIG. 22.

It is noted that the diameters of the pins 64, 65 or 95, 96 are determined in correspondence with sizes of the holes 7, 8 or 91, 92, but that the pins may be tapered for convenience of insertion into the holes. The positioning pins of the camera and the positioning holes of the cassette can be provided in a manner different from the above embodiments, especially in number and placement thereof.

The use-condition signaling structure 19 of the above embodiments represents the two states "Unexposed" and "Exposed," but may represent three states "Unexposed," "Partially exposed" and "Exposed" by forming an additional notch for a "Partially exposed" position between the other two positions. When the cassette is removed from the camera without completing exposure on the full strip of the photographic film, the camera rewinds the film into the cassette shell and causes the signaling slider to shift to the partially exposed position. When the camera is reloaded with the cassette as partially used, the camera at first detects the representation "partially exposed" with the pin 23. It is preferable to provide the cassette with an externally readable data recording medium and to provide the camera with a device for recording/reading data on the recording medium of the cassette. In such a case, the identification data of a final picture frame of the partial exposure on the photographic film before the previous removal of the cassette can be recorded on the recording medium and subsequently read therefrom when the cassette is reloaded. The camera can then automatically advance the photographic film to position an available unexposed part of the photographic film on the exposure aperture. The signaling slider 21, in the above embodiments, is shifted upon an opening operation of the bottom door 72, but alternatively may be shifted upon rewinding the photographic film into the cassette shell or at any other appropriate time.

Figure 24:
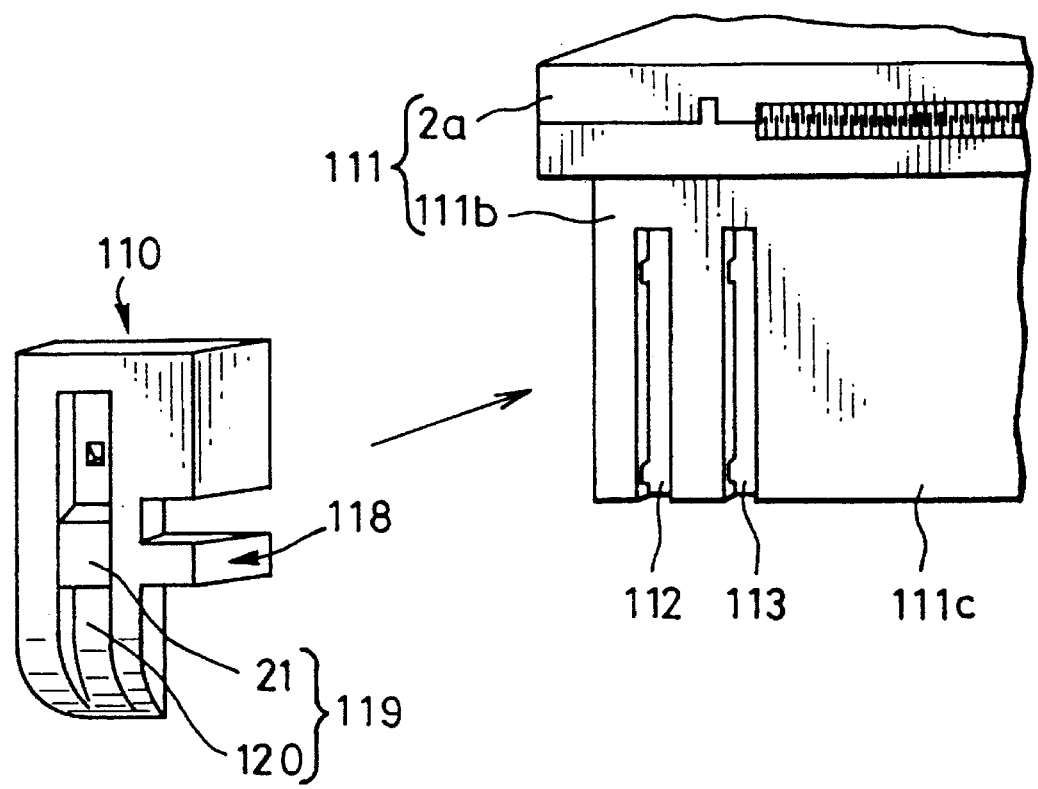
FIG. 24 is a perspective view illustrating a variation of the cassette in which the separate signaling unit is attached to a cassette shell.
Figure 25:
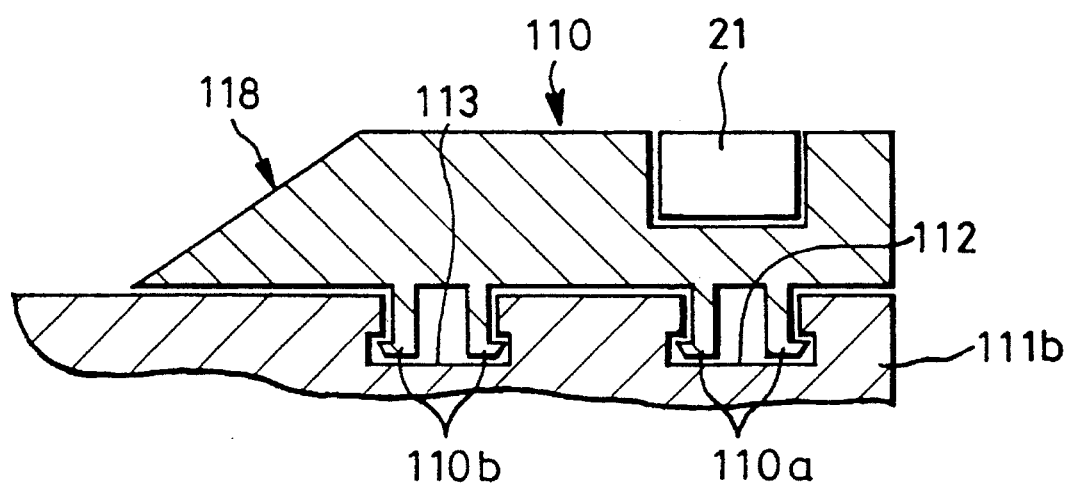
FIG. 25 is a cross section illustrating the signaling unit as attached to the cassette shell.

Also, window groove 20d may be formed in an end face 11a of a cassette shell 102, as illustrated in FIG. 24, on the side of a lower shell half 102b, through which the signaling slider 21 can be seen from the end face 11a of the cassette. The above DX code is coded with three bits to represent six values of ISO sensitivity, but additionally may be coded with more bits to represent the maximum number of the photographable frames, latitude, discrimination between negative/positive, and the like.

Instead of forming the pattern 18 of the DX code integrally with the shell half 2b, the top portions 18a for a binary digit representing "1" may be a separate part removably attached to a cassette shell which adapted to having recesses for receiving the separate top portions so as to allow the cassette to be configured according to a code to be represented. This construction can reduce the number of required shapes of shell halves, thus is favorable in view of convenience in manufacture and inventory management.

Although the DX code pattern 18 and the use-condition signaling structure 19 are inseparable from the cassette shell 2 or 83 of the preferred embodiments, a separate signaling unit 110 may be provided with a DX code patterned portion 118 and a use-condition signaling structure 119, and attached to a circumferential surface 111*c* of a cassette shell 111 on the side of a lower cassette shell 111*b*. The signaling slider 21 for the use-condition signaling structure 119 is fitted inside a groove 120 in a plate of the signaling unit 110. For attachment, the plate of the signaling unit 110 can have claws 110*a* and 110*b*, which are engaged with grooves 112 and 113 formed in the shell half 111*b* for fittedly receiving the claws 110*a* and 110*b*. This construction makes it possible to apply the same cassette shell 111 to different photographic films by exchanging the signaling unit 110 for that having the code pattern 118 of a desired shape.

Also, the spool locking device described above consists of pin 96, spring plate 89, and toothed wheel 90. In the alternative, the locking device could be a friction type device or any other device wherein the spool can be selectively fixed with respect to the cassette shell.

The plush 54 of all the preferred embodiments may be replaced by a sponge material or the like for trapping light inside the passage mouth 4. Although the roll of the photographic film is prevented from loosening by the arcuate ridges 51, 52, or 86*a*, 86*b*, alternatively the cassette shall may have a structure for transmitting rotation to the roll, as disclosed in U.S. Pat. No. 4,834,306, such that annular lips are formed around spool flanges for being in contact with lateral edges of outer turns of the roll, and that spreader projections are formed close to the exit of the photographic film for releasing the outer turns from the annular lips. Also, the cassette may have a structure as disclosed in U.S. Pat. No. 4,846,418, such that a spool is constituted of a pair of flanged cores fitted together, wherein rotation of the spool to unwind the photographic film causes the flanges to move closer to each other and clamp the roll between them so as to transmit rotation to the outer turns of the roll. In addition, the cassette may have a structure as suggested in Japanese Patent Laid-Open Publication No. 3-37645, such that projections are formed on the inside of end faces of the cassette shell for pressing the spool flanges against end faces of the roll of the photographic film, and thus causing the flanges to clamp outer turns of the roll. The structures discussed above are merely examples of the advancing devices that may be utilized by the invention for advancing the leader of the photographic film outward from the cassette shell upon rotation of the spool. In fact, any structure known in the art for this purpose can be utilized in the photographic film cassette of the invention.

Although the present invention has been fully described by way of the preferred embodiments thereof with reference to the accompanying drawings, various changes and modifications will be apparent to those of ordinary skill in the art. Therefore, unless otherwise these changes and modifications depart from the scope of the present invention as defined by the appended claims, they should be construed as included therein.

What is claimed is:

1. A photographic film device having a film cassette in which photographic film is wound on a spool and rotatably contained in a cassette shell, said cassette shell being constituted of a pair of shell halves, an end portion of said spool protrudes through a bearing hole formed in one end face of said cassette shell, and a leader of said photographic film is caused by rotation of said spool to advance to an outside of said cassette shell through a passage mouth, said cassette comprising:

at least two positioning holes, formed in said one end face of said cassette shell, said positioning holes receiving positioning projections of a camera therein when said cassette shell is loaded in said camera so as to position said cassette shell in a predetermined orientation within said camera and direct said passage mouth in a predetermined direction within said camera;

contact means formed on said one end face for coming into contact with receiving means of said camera in order to position said cassette shell within said camera relative to an axial direction of said spool; and locking means disposed in said cassette shell for locking said spool by stopping said spool from rotating with respect to said cassette shell, said locking means being displaced to an unlocked position when said cassette shell is inserted in a cassette receiving chamber of said camera.

2. A photographic film device as defined in claim 1, wherein a through hole is formed in an end face of said cassette shell proximate said locking means, an unlocking pin formed in said camera is inserted through said through hole so as to displace said locking means to said unlocked position when said cassette shell is inserted into said receiving chamber.

3. A photographic film device as defined in claim 2, wherein one of said positioning holes constitutes said through hole, and one of said positioning projections constitutes said unlocking pin.

4. A photographic film device as defined in claim 2, wherein said through hole is on an end face of said cassette shell that is opposite to said one end face, and said unlocking pin is formed on a door which is disposed on a bottom portion of said camera so as to close said cassette receiving chamber of said camera.

5. A photographic film device as defined in claim 4, wherein said locking means comprises:

a toothed wheel formed on said spool in a position outward from one flange of said spool, said toothed wheel being contained in said cassette shell and teeth formed on said toothed wheel moving through a path as said spool rotates; and a locking spring plate disposed in said cassette shell for arresting said toothed wheel, said spring plate comprising:

a proximal portion supported in said cassette shell;

a resilient extended portion formed to extend from said proximal portion towards a core of said toothed wheel, said extended portion being in opposition to said through hole; and a stopper portion projecting from a distal end of said extended portion into said path of a tooth of said toothed wheel, said stopper portion being shifted out of said path when said extended portion is pressed by said unlocking pin so as to allow said spool to freely rotate.

6. A camera for use with a photographic film cassette in which photographic film is wound on a spool and rotatably contained in a cassette shell, a leader of said photographic film being caused by rotation of said spool to advance to an outside of said cassette shell through a passage mouth, said camera having a cassette receiving chamber formed therein for receiving said cassette comprising:

- a driving shaft disposed in said cassette receiving chamber for being engaged with an end of said spool;
- at least two positioning projections projected from an upper inside face of said cassette receiving chamber, said positioning projections being fitted in at least two positioning holes formed in said shell end face, when said cassette is inserted in said receiving chamber, so as to position said cassette in a predetermined orientation with respect to said camera and direct said passage mouth in a predetermined direction relative to said camera;
- receiving means formed on said upper inside face of said cassette receiving chamber for coming in contact with contact means formed on said cassette so as to position said cassette within said camera relative to an axial direction of said spool;
- an unlocking pin which passes through a through hole formed in said cassette shell when said cassette is loaded in said cassette receiving chamber; and
- locking means disposed in said cassette shell in opposition to said through hole for locking said spool by stopping said spool from rotating, said unlocking pin displaces said locking means to an unlocked position when said unlocking pin is passed through said through hole.

7. A camera as defined in claim 6, wherein said unlocking pin is formed on an upper inside face of said cassette receiving chamber, one of said positioning holes being adapted to being said through hole.

8. A camera as defined in claim 6, further comprising a bottom door for closing said cassette receiving chamber, said unlocking pin being formed on said bottom door, and said through hole is directed downward when loading said cassette.

* * * * *